Jan. 29, 1935.  C. C. BENNETT  1,989,307
WHEEL ALIGNING EQUIPMENT
Filed Nov. 14, 1932   4 Sheets-Sheet 1
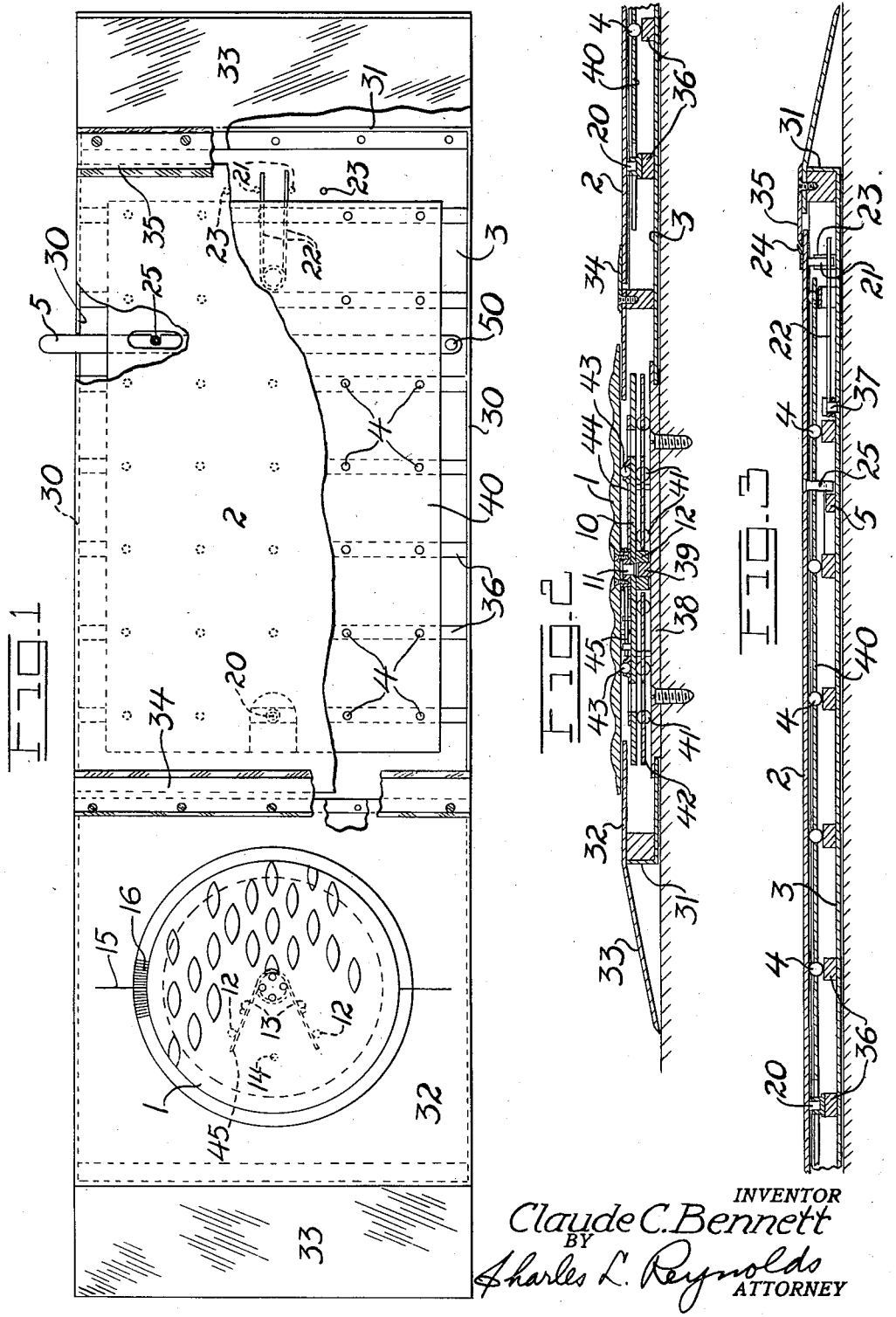
INVENTOR
Claude C. Bennett
BY
Charles L. Reynolds
ATTORNEY Jan. 29, 1935. C. C. BENNETT 1,989,307
WHEEL ALIGNING EQUIPMENT
Filed Nov. 14, 1932 4 Sheets-Sheet 2
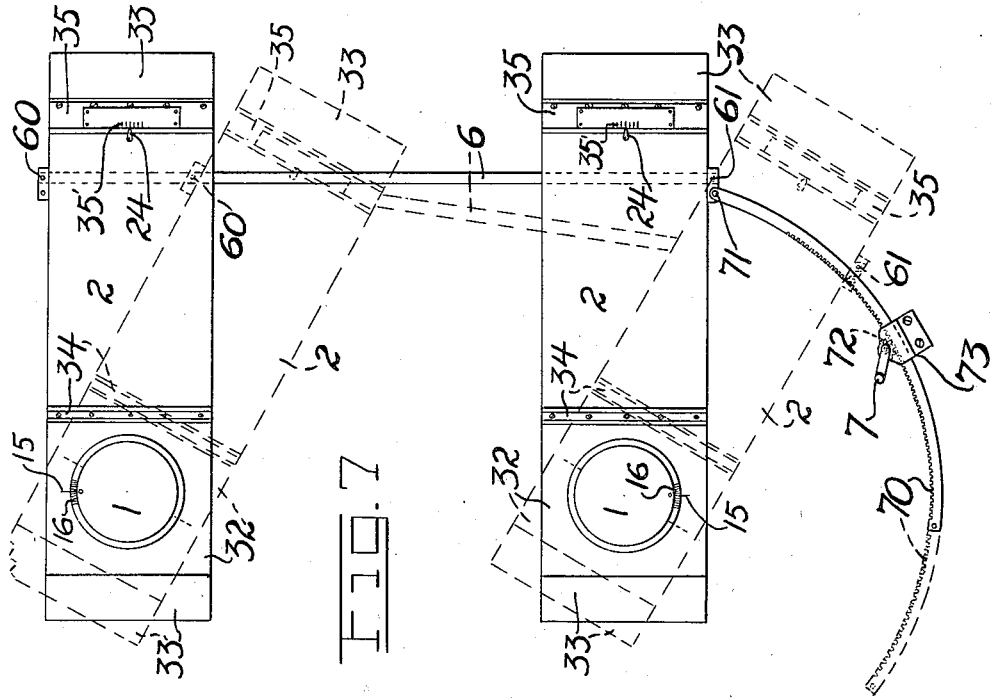
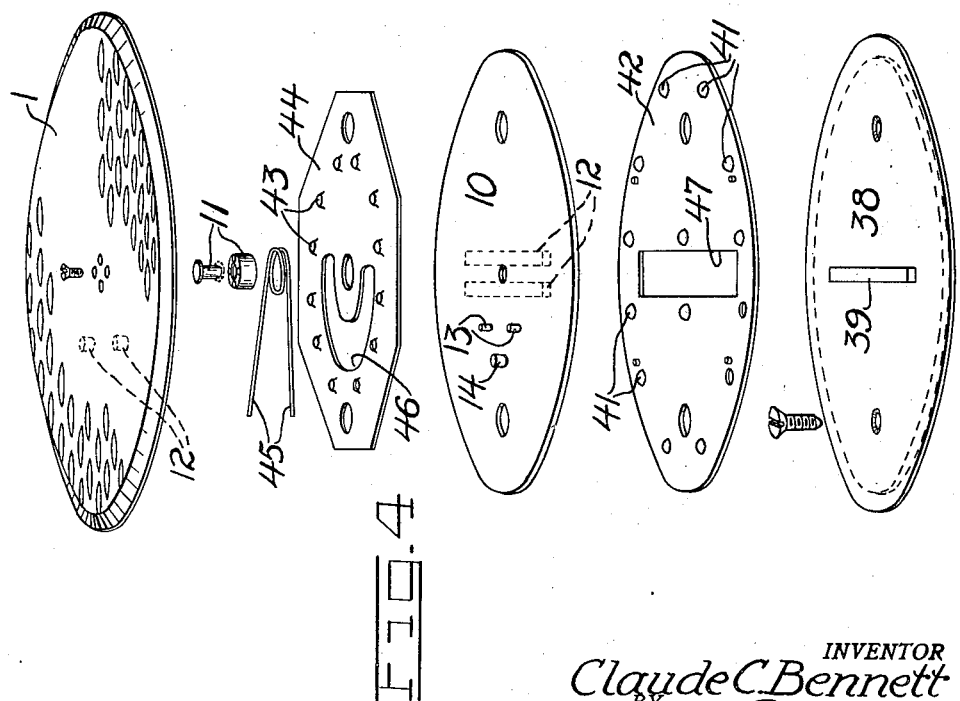
INVENTOR
Claude C. Bennett
BY
Charles L. Reynolds
ATTORNEY Jan. 29, 1935.  C. C. BENNETT  1,989,307
WHEEL ALIGNING EQUIPMENT
Filed Nov. 14, 1932  4 Sheets-Sheet 3
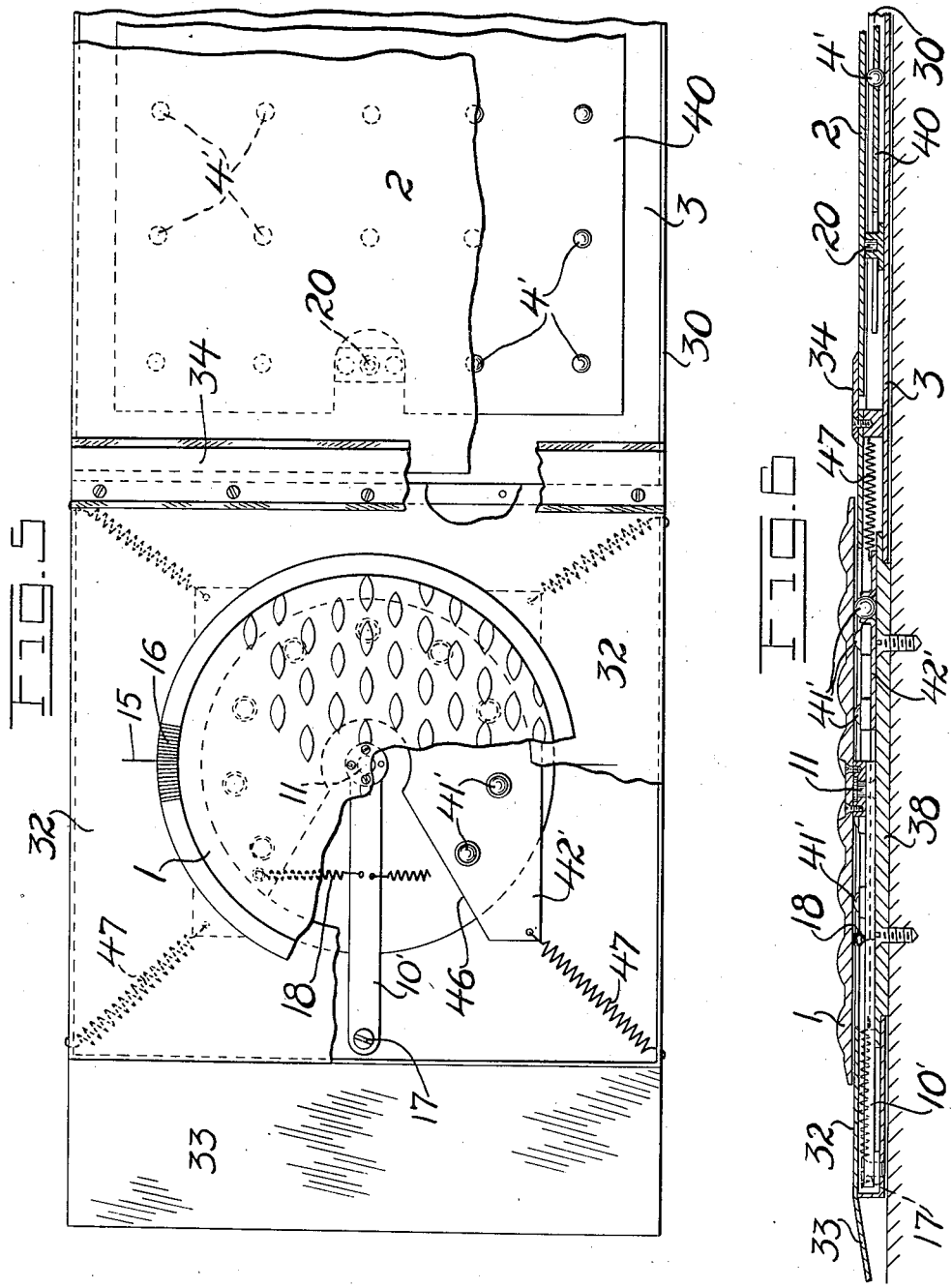
INVENTOR
Claude C. Bennett
BY
Charles L. Reynolds
ATTORNEY Jan. 29, 1935. C. C. BENNETT 1,989,307
WHEEL ALIGNING EQUIPMENT
Filed Nov. 14, 1932 4 Sheets-Sheet 4
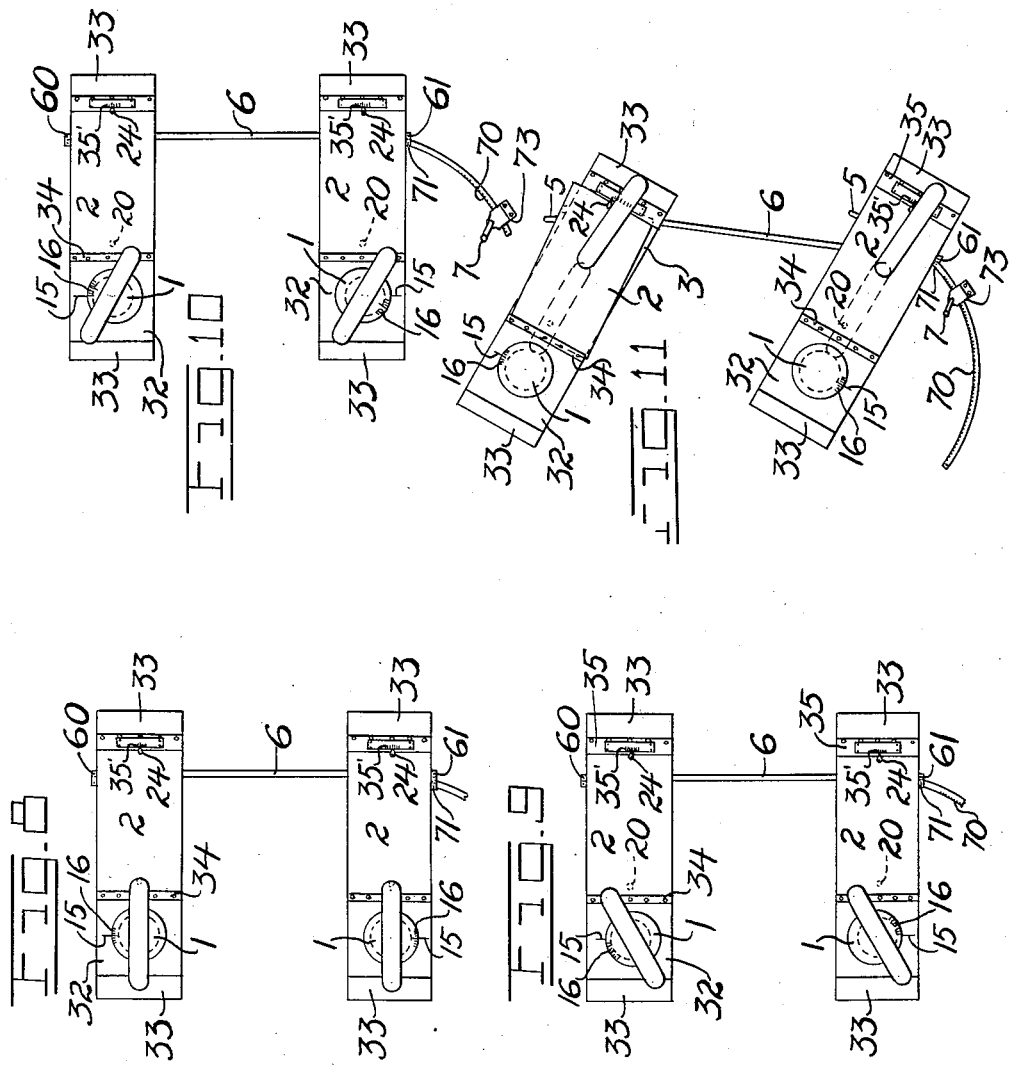
INVENTOR
Claude C. Bennett
BY
Charles L. Reynolds
ATTORNEY Patented Jan. 29, 1935

1,989,307

UNITED STATES PATENT OFFICE 1,989,307

WHEEL ALIGNING EQUIPMENT

Claude C. Bennett, Seattle, Wash., assignor to A. E. Feragen, Inc., Seattle, Wash., a corporation of Washington Application November 14, 1932, Serial No. 642,504

22 Claims. (Cl. 33—203)

My invention relates to an improvement in wheel aligning equipment. It pertains more especially to equipment for the purpose of determining whether or not there is side thrust in the wheels of a steerable pair, whether these wheels be in the straight-ahead or in any turned position, and to equipment for determining wherein such misalignment lies, the whole conveniently arranged to carry out the several operations necessary with a minimum of trouble and delay. It is, so to speak, a device whereby the car's owner can be convinced, quickly and effectively, that his steering system is or is not in alignment, and if it is not, that corrective measures should be undertaken.

It is an object of my invention to devise a piece of apparatus intended to be placed upon the floor in the path of a vehicle to be tested, either by itself or as part of a line of testing equipment, whereby the factor of side thrust and the reasons therefor can be particularly ascertained.

It is an object to devise mechanism whereby the two wheels, or either one of such pair of wheels, can be quickly and readily tested on the straight-away and on a right and a left turn.

It is a further object to provide means associated with such aligner board facilitating the turning of the wheel to correspond with the turning of the aligner board or boards, and to determine the relative angle of movement of each wheel about its king pin in turning curves.

More specifically, it is an object to provide mechanism having an aligner board and a turntable associated therewith, and to provide a construction and mounting for each, whereby they can best cooperate in the several determinations necessary to the complete operation of ascertaining the presence or absence of side thrust.

Another object is to provide a mounting for a turntable which will give to it the necessary freedom of movement, laterally and rotationally, and preferably which will automatically return it to its normal or zero position, following such determinations.

It is also an object to provide a cheap and convenient ball-supporting structure for movable wheel-tread-engaging members of this type, whether the movement be lateral, swinging or pivotal.

With these and other objects in view, as will be understood from this specification and from the drawings, my invention comprises the novel parts and the novel combination and arrangement thereof, as shown in the accompanying drawings, described in this specification, and as will be more particularly defined by the claims which terminate the same.

In the accompanying drawings I have shown my invention embodied in forms which are now preferred by me.

Figure 1 is a plan view, with parts broken away, of one of the units of my improved device.

Figures 2 and 3 are vertical longitudinal axial sections through this form of my device, showing the two different ends thereof.

Figure 4 is an exploded view in perspective of the various parts making up the turntable and its support.

Figure 5 is a plan view, with parts broken away, of a modified form of construction, and Figure 6 is a view similar to Figure 2 of this modification.

Figure 7 is a plan view of the complete or double unit.

Figures 8, 9, 10 and 11 are diagrammatic plan views illustrating the various operations performed with my device.

By the use of the aligner board shown in my Patent No. 1,675,481, which was portable, it is possible to determine the presence or absence of side thrust in a pair of steerable wheels, whether in the straight-ahead or in any turned position, but to accomplish these several determinations it is necessary to move the board from place to place. By the use of the apparatus shown in the Frazier Reissue Patent No. 18,047 it is possible to run two wheels of a pair upon the aligner boards at one time, but it was quite inconvenient to run these wheels upon the two aligner boards at such times as the wheels were turned to guide the vehicle about a curve, and it is awkward and time consuming to carry out the determinations in straight-ahead, turned-right, and turned-left positions of the wheels. Because of the necessity for conserving space, and because there has grown up the practice of testing a vehicle, in the presence of the driver (who may be thereby advised if correction is needed), in rapid succession for various possible faults, for instance, for faulty brake adjustment, for wheel alignment, and for faulty or glaring lights, it is highly desirable to devise mechanism which can be made an integral part of such a chain of mechanisms, whereby the side thrust of the wheels can be quickly and accurately determined while the vehicle is in line, going through the several processes, and without deflecting it from the line. It is to this end in particular that my present invention is directed.

Each unit of my invention comprises three principal parts—a support 3, a turntable 1, and a member 2 which is herein shown as taking the form of an aligner board of some considerable length in the direction of travel of the wheel to be tested, which aligner board is movable transversely, in part or bodily, under the side thrust of a misaligned wheel, thus by its displacement relative to the support to indicate the presence or facts of misalignment.

While the member 2 is herein shown as a flat board, it must be borne in mind that it is its quality of contacting with the tread of the wheel, or of the tire thereon, over a considerable linear distance which gives this member 2 its quality of indicating, without question, the presence or absence of wheel side thrust. This same quality might be accomplished if the wheel being tested were to run over the cylindrical surface of a roller over a like linear distance, provided the roller were so mounted as to be displaced laterally by side thrust, and such a roller is shown in the patent to Prather, Reissue Patent No. 18,138.

The support 3 is ordinarily formed of a sheet of steel having flanges 30 at the sides and flanges 31 defining the ends. The latter may be suitably reinforced; the side flanges do not need reinforcing. Preferably this support 3 extends under the aligner board 2 and under the turntable 1. To give access to the turntable, and to allow easy run off from the board 2, ramps or end pieces 33 may be provided, and a continuation of one of these, as indicated at 32, covers over the space beneath the turntable. A strip 34 overlies one end of the aligner board 2, and a strip 35 overlies its opposite end, chiefly to prevent dirt getting beneath the board.

The aligner board 2 is preferably pivotally supported, as indicated at 20, the pivotal engagement being with the support 3 or with a bar 36 secured thereon and extending transversely. To permit the aligner board to swing freely I support it upon balls 4. The balls as shown in Figures 1, 2 and 3 are not of sufficiently large diameter to extend between the under side of the aligner board 2 and the upper side of the support 3, though they might be of this size, or this distance might be reduced, as shown in Figures 5 and 6, but with small-sized balls I prefer to employ a series of the transverse bars 36, previously referred to, which are in effect a part of the support 3, whereon these balls ride. In effect, then, these balls rest upon the top of the support. To retain them in position I have found it convenient and cheap to employ a ball retainer plate 40, which plate is apertured at intervals to receive the balls 4, and thus the balls may be left free to roll between the aligner board 2 and the support 3, or the equivalent—the bars 36—without friction. They are easily put in place, and yet the ball-retainer means is inexpensive.

It will be understood that the ball-retainer plate 40 will have to be cut out in places in order to permit a direct connection between the aligner board 2 and the support 3 or like members beneath the plate 40. Thus, for example, it is cut out to allow for the pivot at 20.

The aligner board 2 is normally maintained in a zero position by spring means, and while various means may be employed, that which I have shown herein, and which I will now describe, has been found convenient, simple and inexpensive. Thus a spring is coiled a few times about a stud 37 secured in the support 3, and its ends 22 extend outward toward the end of the aligner board to a point where they may be engaged and kept from spreading farther apart, under the stress of coiling, by pins 21 depending from the end of the aligner board 2. The pins 23 in the support 3 are positioned to engage the pins 21 and prevent greater swing of the aligner board.

The movement of the aligner board 2 thus permitted can be indicated merely by the displacement of the edge of the aligner board relative to the edge of the support 3, or it can be indicated by a suitable scale 35' on the plate 35, with which cooperates an index finger 24 upon the end of the aligner board. Thus can be indicated the departure of the aligner board from zero position, in which position it is normally held by the spring 22.

The turntable, for reasons which will appear hereafter, must not only rotate, but it must be free for transverse movement to a limited extent. Also, for reasons which will appear hereafter, the entire support 3 should be swingable about a fixed point, preferably the normal center of the turntable, though some other point might be used. It is preferably located adjacent the pivoted end of the aligner board 2. Keeping in mind the necessity for accomplishing these ends will make clearer the reasons for the construction adopted in association with the turntable and its support.

I prefer that the turntable be supported upon a base 38, which may be secured to the floor by screws. This base may be circular in outline, and be provided with a marginal flange (see Figures 2 and 6), whereby it fits within and overlies the edge of a circular hole cut in the support 3, whereby the support may swing around this fixed base in a horizontal plane. Thus it swings substantially about the center of the turntable 1, which in the zero position of the turntable is substantially coincident with the center of the fixed base 38.

The turntable, in order that it may have transverse movement, is preferably not supported directly upon the base 38, but upon a plate 10 which is supported above the base. The pivotal connection between the turntable 1 and the plate 10 is shown at 11 (see Figure 2). The plate 10 is guided for sliding movement transversely of the base 38, as for example by means of interlocking ribs 39 and 12 on the base and plate, respectively. To give freedom of movement of the plate 10 relative to the base 38, and of the turntable relative to the plate, I may provide ball supports and retainers similar to those previously described. For convenience in distinguishing them, the balls 41 held in apertures in the plate 42 support the plate 10 from the base 38, while the balls 43 retained by the plate 44 support the turntable 1 from the plate 10. The plate 42 is apertured, as shown at 47, for the projection through it of the guide ribs 39 and 12.

It is not necessary, nor is it desirable, to provide a means to return the turntable and plate 10 to a zero position after transverse movement, since the distance between the points of contact of the two opposite tires of a steerable pair may vary somewhat in different vehicles, and it is preferable to be able to position the turntable in such a way as to receive the center of the contact of the wheel at the center of the turntable. However, it is preferable that the turntable be returned to zero position after any rotational movement, and this may be accomplished in any suitable way—for example, in a manner similar to that described for returning the aligner board to its zero position. Thus a spring is coiled about the pivot 11 of the turntable, and its ends 45 are engaged by pins 12 which depend from the turntable 1, and their spreading action is limited by pins 13 upstanding from the plate 10.

Rotational movement away from the zero position is limited by a stop pin 14 upstanding from the plate 10 and positioned to be engaged by either of the pins 12. The plate 44 is apertured, as indicated at 46, to permit projection of the pins therethrough.

A suitable means is provided for indicating when the turntable 1 is in zero position, and by what amount it may have departed from that zero position. Thus an index mark 15 may be placed upon the cover plate 32, with which cooperate the angular scale marks 16 upon the edge of the turntable. The lateral movement of the turntable will not affect registry of the marks 15 and 16.

With the arrangement just described the turntable 1 is free to move laterally, for reasons which will appear hereafter, and is also free to rotate on its pivot 11. Upon removal of the force which causes its rotation, the spring 45 will return the turntable to its zero position with respect to the index line 15, but, as pointed out above, the turntable may remain in any position within its limits of movement transversely.

The arrangement shown in Figures 5 and 6 is similar to that already described, though employing fewer parts and requiring less thickness in the device. Thus, in so far as concerns the aligner board 2, a set of supporting balls 4' is employed, which balls are large enough to rest upon the support 3 directly, and to engage the under side of the aligner board 2 directly. In connection with the turntable 1 I employ the base 38 as before, but a single set only of balls 41' are employed, these being supported in a plate 42' which is apertured at one edge, as indicated at 46. Springs 47 at the four corners of the plate 42' tend to center it. The pivot 11 in this form is supported upon an arm 10', corresponding in function to the plate 10 of the other form, this arm being pivotally supported upon the support 3 by means of a pivot 17. Springs 18 tend to center the arm 10'. Thus, lateral displacement of the turntable 1 is permitted by reason of the swinging of the arm 10', and upon removal of the displacing force the springs 47 and 18 tend to return parts to their normal position, disposed centrally of the sides of the support 3. Rotational movement of the turntable 1 with respect to the members supporting it is obtained as before in any position of the arm 10'.

I prefer, for the purposes mentioned hereinabove, to employ two such units spaced apart approximately the distance between the wheels of a steerable pair upon an automobile, and any variations in this width in the wheels of a particular vehicle can be compensated for by lateral displacement of one or the other of the turntables. The vehicle to be tested is run first upon these turntables (see Figure 8), and may be checked by turning the wheels to one side and then to the other, as in Figures 9 and 10, respectively. For any given car, in order to maintain the planes of the respective wheels each at right angles to a radius through a given point, the center of which is the point about which the vehicle as a whole turns, the inside wheel on each turn must, because of its position and relationship to the opposite wheel of the pair, turn through a greater angle. By measuring the angle through which each wheel turns, first when turning them as though to round a curve in one direction, and then as though to round a curve in the opposite direction, it can be ascertained whether the two wheels turn through the proper angular amount in order to keep them in perfect alignment while rounding any curve. Because the vehicle is not rolling about a curve when the wheels are thus cramped to one side and to the other, and because of the caster effect of the wheels, there is a movement of the center of contact of one wheel towards such center of the opposite wheel, and unless the turntables are free to move laterally, binding will ensue, and the determination will not be accurate.

Before or after the determination of the relative angles of the wheels, by the use of the turntables, the wheels may be run ahead onto the aligner boards, which preferably are first positioned in the straight-ahead position of the wheels, as shown in Figure 8 by way of example. If there is any misalignment of the wheels, due to any one or a number of causes, this will be indicated by relative side thrust causing displacement of one or both of the aligner boards over which the wheel is travelling. Thus, if the turntable measurements show one wheel to be inaccurately connected to the other, the effect of this improper connection is graphically illustrated when the wheels roll along the aligner boards by displacement of the latter. In order that there may be more definite indication of side thrust, if it exists, means are provided whereby each one of the aligner boards (only one at a time) may at will be locked against lateral movement. Such means are shown, by way of example, in Figures 1 and 3. A locking lever 5, pivoted at 50 to the support 3, has a notch within which may be received a pin 25 projecting downwardly from the aligner board 2. The pin and notch are so located that when engaged the aligner board will be in its normal or zero position. The plate 40 is apertured to permit passage therethrough of the pin 25, and the flange 30, adjacent the end of the lever 5, is cut out to permit movement of this lever.

Having ascertained whether the alignment of the wheels produces any side thrust in rolling straight-ahead, it is now necessary to determine if there is side thrust when the wheels are positioned to roll about a curve, for it does not at all follow that wheels in alignment when straight-ahead are properly aligned when turned to one side. The vehicle may now be rolled back to rest the wheels upon the turntables, and turned with the turntables, as indicated in Figures 9 and 10, and the aligner boards are now swung each in its horizontal plane into position substantially corresponding with the path of the wheel in rolling about a curve, and the wheel is rolled ahead along the aligner board, thus swung laterally from the straight-ahead path, as indicated in Figure 11. If side thrust now exists, the aligner board will be displaced in a manner indicated in the upper or left hand board of Figure 11. After testing the wheels in this manner for a right turn, the vehicle may be rolled back to rest the wheels upon the turntables, rotated for a left turn, the aligner boards and their support swung into line with the wheels in their new position, and the wheels may again be rolled along the aligner boards to determine whether side thrust is present in making the opposite turn. The vehicle may then be run directly off the aligner boards, or the wheels may be brought back to the turntables, straightened up, and the aligner boards positioned again for straight-ahead movement, whereupon the vehicle may run off the aligner boards ready for further tests, or for correction of any misalignment which has been discovered. The whole operation is simple, and can be accomplished with great rapidity.

The aligner boards may be swung independently of each other, but it is preferable that they be connected, and since they should turn differentially, that is to say, the inside board for any turn should assume a greater angle to the normal straight-ahead position than the outside board, they may be connected by a tie rod 6 located and connected to the two boards in a manner generally similar to the connection of the tie rod of an automobile steering system to the two steering arms. Thus giving the boards the designation corresponding to the wheels of the car which are being tested, the rod 6 may be connected to the left hand board at a point 60 on the outer side of this board, and to the right hand board at a point 61 also on the outer side of this board. To move the boards rapidly and to control their swinging I may provide any convenient means, for example, the curved rack 70 connected to one of the aligner boards, as indicated at 71, and a handle 7 controlling a pinion 72 in mesh with the rack 70, which is guided in a clip 73. Upon turning the handle 7, the boards are rapidly swung from one position to another, and by the connection of the connecting rod 6 they are differentially moved.

What I claim as my invention is:

1. Wheel aligning equipment comprising, in combination, two runner boards spaced apart, a support for each, a pivotal anchor for each support, whereby each support may swing from a straight-ahead position, in which it is parallel to the companion board, means restraining the two supports, during such swinging, to movement only into relative angular positions corresponding generally to the relative angular positions of the steerable wheels on a turn, and the runner boards being each mounted upon its support for lateral displacement relative to its support under the side thrust of a misaligned wheel or wheels, whereby to indicate such side thrust in any position of the supports.

2. Wheel aligning equipment comprising, in combination, two runner boards spaced apart, a support for each, a pivotal anchor for each support, whereby each support may swing from a straight-ahead position, in which it is parallel to the companion board, means connecting the two supports to dispose them when thus swung, in relative angular positions corresponding generally to the relative angular positions of the steerable wheels on a turn, the runner boards being each mounted upon its support for lateral displacement relative to its support under the side thrust of a misaligned wheel or wheels, whereby to indicate such side thrust in any position of the supports, and means to fix one runner board relative to its support, whereby the other board only is movable to indicate side thrust.

3. Wheel aligning equipment comprising, in combination, two turntables spaced to support each a wheel of a pair of steerable wheels, a separate support for each turntable, means associated with each turntable to determine its angular departure relative to its support from a zero position, a tire tread contacting member likewise supported upon each support, in alignment with the corresponding turntable, and adapted to contact with the respective wheels over a considerable linear distance, each such member being mounted for movement transversely under the side thrust of a misaligned wheel of the pair, means associated with said members for indicating such transverse movement, and a pivot anchor for each support, adjacent the pivot axis of the corresponding turntable, about which such support, with its tread contacting member, may be swung laterally.

4. Wheel aligning equipment comprising, in combination, two turntables spaced to support each a wheel of a pair of steerable wheels, a separate support for each turntable, normally disposed in parallelism, a tire tread contacting member likewise supported upon each support, in alignment with the corresponding turntable, and adapted to contact with the respective wheels over a considerable linear distance, each such member being mounted for movement transversely under the side thrust of a misaligned wheel of the pair, thereby to indicate such side thrust, and means restraining the two supports to swinging movement about axes substantially corresponding to the axes of the respective turntables, and through relative angular positions corresponding generally to the relative angular positions of the steerable wheels on a turn.

5. Wheel aligning equipment comprising, in combination, two turntables spaced to support each a wheel of a pair of steerable wheels, means associated with each turntable to determine its angular departure from a zero position, a tire tread contacting member associated with each turntable, and adapted to contact with the respective wheels over a considerable linear distance, each such member being mounted for movement transversely under the side thrust of a misaligned wheel of the pair, thereby to indicate such side thrust, and a support for each tire tread contacting member guided to swing angularly about an axis substantially coinciding with the axis of the associated turntable, to correspond to the wheel angle in rolling about a curve.

6. Wheel aligning equipment comprising, in combination, two supports spaced in accordance with the spacing of a pair of steerable wheels being tested, a pivotal anchor for each of said supports, and means to swing said supports simultaneously, in a horizontal plane, each angularly about its anchor, into positions corresponding to the angles of the respective wheels in rolling about a curve, and a wheel-tread-engaging member supported upon each such support for movement transversely relative thereto, in any position of the corresponding support, under the side thrust of a misaligned wheel, said members each having means associated therewith to indicate transverse movement relative to its support.

7. Wheel aligning equipment comprising, in combination, two supports spaced in accordance with the spacing of a pair of steerable wheels being tested, and of considerable length in the direction of travel of such wheels, a pivotal anchor for each support, about which it is swingable in a horizontal plane angularly about a fixed center adjacent to one end, into positions corresponding to the angles of the respective wheels in rolling about a curve, a wheel-tread-engaging member likewise of considerable length supported upon each such support for movement transversely relative thereto, in any position of the associated support, under the side thrust of a misaligned wheel, and a tie rod joining the two supports, remote from such fixed centers, and connected to each outside of a longitudinal median line through such centers.

8. Wheel aligning equipment comprising, in combination, a support adapted to rest upon the floor, and having a circular hole, a flanged circular base received within and overlying the edge of said hole, and secured to the floor, about which the support may swing, a turntable disposed above the base, a member interposed between the base and turntable, and directly supporting the latter for rotation, means cooperating between said base and said member to restrain said member to movement in a definite path transversely of the support, and a runner board supported upon the support for lateral displacement relative thereto under the side thrust of a misaligned wheel rolling thereover.

9. Wheel aligning equipment comprising in combination, a runner board, a support supporting the same for lateral displacement relative to such support under the side thrust of a wheel of a misaligned pair running therealong, pivot means adjacent to and engaging the run-on end of the support, whereby the latter, with its runner board, may be swung to either side of a straight ahead position, to test alignment of the wheels on right and left curves, and a turntable supported substantially coaxially with the pivot of the support, and in line with the runner board, whereon the wheel may rest and be swung to bring it into alignment with the runner board in any position of the support.

10. Wheel aligning equipment comprising, in combination, a tire tread contacting member, means supporting the same for displacement laterally relative to such support under the side thrust of a wheel of a misaligned pair running therealong, means to anchor the support to a floor or the like, including a pivot member about which the support and its tread contacting member may swing to either side of a normal straight-ahead position, thereby to determine misalignment of the wheels on curves as well as straight ahead, and a turntable likewise mounted on said support, adjacent and in line with the run-on end of the tread contacting member whereon the wheel may rest while the support is being swung, and which may itself be swung to bring the wheel into alignment with the tread contacting member in its newly swung position.

11. Wheel aligning equipment comprising, in combination, a runner board, means whereon said runner board, adjacent to one end, is pivotally mounted, thereby to be swung laterally about its pivot by the side thrust of a wheel of a misaligned pair running therealong, a pivotal anchor for said means spaced from the board's pivot in the direction from which the wheel advances, and a turntable mounted adjacent to said anchor, whereon the wheel may rest to permit swinging of the support about such anchor, and which may itself be swung to bring the wheel into alignment with the runner board in all positions of the latter about its anchor.

12. Wheel aligning equipment comprising, in combination, a tire tread contacting member, said member being mounted for lateral displacement when traversed by a misaligned wheel, means to indicate such displacement, a support for said member pivotally mounted to swing to each side of a given straight-ahead position, to test the wheel on right and left turns as well as in the straight-ahead position, and a turntable disposed in the vicinity of the pivotal mounting of the support, whereon the wheel may rest while the support and said member are being swung to a new position, and whereon the wheel may be swung on its king pin into alignment with the new position of said member.

13. Wheel aligning equipment comprising, in combination, a means traversable by a wheel being tested, as the wheel rotates, over a considerable length of the wheel's periphery, said means being mounted for lateral displacement when thus traversed by a misaligned wheel, means to indicate such displacement, a support for said means pivotally mounted to swing to each side of a given straight-ahead position, to test the wheel on right and left turns as well as in the straight-ahead position, a turntable disposed in the vicinity of the pivotal mounting of the support, whereon the wheel may rest while the support and said means are being swung to a new position, and whereon the wheel may be swung on its king pin into alignment with the new position of said means, and means to indicate the angular departure of the turntable from any given position.

14. Wheel aligning equipment as in claim 12, including a pivotal support for the turntable, which is independent of the pivotal mounting of the support, said pivotal support of the turntable being movable relatively to the pivotal mounting of the support.

15. Wheel aligning equipment as in claim 12, including a pivotal support for the turntable, which is independent of the pivotal mounting of the support, and means restraining the pivotal support for the turntable to movement in a direction generally laterally of the direction of traverse of the wheel along the means referred to.

16. Wheel aligning equipment comprising, in combination, a means traversable by a wheel being tested, as the wheel rotates, over a considerable length of the wheel's periphery, a support therefor, said means being mounted on said support for lateral displacement relative thereto when thus traversed by a misaligned wheel, means to indicate such displacement, a member pivotally engaging said support, about which the latter, with said means, may swing to each side of a given straight-ahead position, to test the wheel on right and left turns as well as in the straight-ahead position, a turntable supported upon said member, whereon the wheel may rest while the support and said means are being swung to a new position, and whereon the wheel may be swung on its king pin into alignment with the new position of said means, and means to indicate the angular departure of the turntable from any given position.

17. Wheel aligning equipment comprising, in combination, a runner board disposed to be traversed longitudinally by a wheel, a support therefor, whereon the runner board is pivotally mounted to swing laterally under the influence of side thrust in a misaligned wheel running thereon, means to indicate such swinging, a pivotal anchor for the support in advance of the pivotal mounting of the runner board, in the direction of movement of a wheel being tested, a turntable rotatively mounted adjacent to the pivotal anchor of the support, whereby, with the wheel resting upon the turntable the support and runner board may be swung to each side of a straight-ahead position, and the wheel may be swung into alignment with such new position of the runner board.

18. Wheel aligning equipment as in claim 17, including a member rotatively supporting the turntable, and means restraining said member to movement in a direction generally laterally of the runner board.

19. Wheel aligning equipment comprising, in combination, wheel-supporting means, pivot means therefor, means to indicate the angular departure of said wheel-supporting means from a zero position, and means guided to turn about the axis of said pivot means, said last-mentioned means being laterally displaceable relative to a zero position under the side thrust of a misaligned wheel rotating on its spindle.

20. Wheel aligning equipment comprising, in combination, wheel-supporting means, pivot means therefor, means to indicate the angular departure of said wheel-supporting means from a zero position, means guided to turn about the axis of said pivot means, said last-mentioned means being laterally displaceable relative to a zero position under the side thrust of a misaligned wheel rotating on its spindle, and a common support from which both said wheel-supporting means and said laterally displaceable means are supported.

21. Wheel aligning equipment comprising, in combination, two turntables spaced to support each a wheel of a pair of steerable wheels, means associated with each turntable and guided to swing from a neutral position about the axis of its associated turntable, said two means being relatively movable under the side thrust of a misaligned wheel rotating on its spindle, and means associated with said first means constraining said first means to swing differentially relatively to each other when swung from their neutral positions.

22. Wheel aligning equipment comprising, in combination, two means, one for each wheel of a pair of steerable wheels, means guiding said first means to swing from straight-ahead positions in which said two first means are parallel, and means constraining said two first means to swing differentially into positions corresponding generally to the relative angular positions of the steerable wheels on a turn, said two first means being relatively laterally displaceable under the side thrust of a misaligned wheel rotating on its spindle.

CLAUDE C. BENNETT.